US010920055B2

(12) United States Patent
Gahleitner et al.

(10) Patent No.: US 10,920,055 B2
(45) Date of Patent: Feb. 16, 2021

(54) HETEROPHASIC POLYPROPYLENE COMPOSITION WITH IMPROVED MECHANICAL AND OPTICAL PROPERTIES

(71) Applicant: BOREALIS AG, Vienna (AT)

(72) Inventors: Markus Gahleitner, Neuhofen/Krems (AT); Jingbo Wang, Linz (AT); Friedrich Berger, Linz (AT); Johanna Lilja, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/340,646

(22) PCT Filed: Oct. 17, 2017

(86) PCT No.: PCT/EP2017/076455
§ 371 (c)(1),
(2) Date: Apr. 9, 2019

(87) PCT Pub. No.: WO2018/077663
PCT Pub. Date: May 3, 2018

(65) Prior Publication Data
US 2020/0048443 A1 Feb. 13, 2020

(30) Foreign Application Priority Data
Oct. 25, 2016 (EP) .................................... 16195587

(51) Int. Cl.
C08L 23/16 (2006.01)
C08L 23/12 (2006.01)
C08K 5/01 (2006.01)
C08K 5/098 (2006.01)

(52) U.S. Cl.
CPC ............... *C08L 23/12* (2013.01); *C08K 5/01* (2013.01); *C08K 5/098* (2013.01); *C08L 23/16* (2013.01); C08L 2203/16 (2013.01); C08L 2205/02 (2013.01); C08L 2205/24 (2013.01); C08L 2207/02 (2013.01); C08L 2314/02 (2013.01)

(58) Field of Classification Search
CPC .......... C08L 23/16; C08L 23/12; C08L 23/20; C08L 2205/24; C08L 2203/16; C08L 2314/02; C08L 2205/02; C08L 2207/02; C08K 5/098; C08K 5/01
See application file for complete search history.

(56) References Cited

U.S. PATENT DOCUMENTS

2011/0136959 A1* 6/2011 Brandstetter ........... C08L 23/10
524/451
2013/0203908 A1* 8/2013 Kock ....................... C08L 23/06
524/119

FOREIGN PATENT DOCUMENTS

| EP | 1028984 B1 | 7/2001 |
| EP | 887379 B1 | 12/2004 |
| EP | 1661935 A1 | 5/2006 |
| EP | 1801156 A1 | 6/2007 |
| EP | 2610270 A1 | 7/2013 |
| EP | 2610271 A1 | 7/2013 |
| EP | 2610272 A1 | 7/2013 |
| EP | 3015504 A1 | 5/2016 |
| WO | 92/12182 A1 | 7/1992 |
| WO | 99/24478 A1 | 5/1999 |
| WO | 99/24479 A1 | 5/1999 |
| WO | 2018/077663 A | 8/2000 |
| WO | 00/68315 A1 | 11/2000 |
| WO | 2004/000899 A1 | 12/2003 |
| WO | 2004/055101 A1 | 7/2004 |
| WO | 2004/111095 A1 | 12/2004 |
| WO | 2012/007430 A1 | 1/2012 |
| WO | 2015/197434 A1 | 12/2015 |
| WO | 2016/008749 A1 | 1/2016 |
| WO | 2016/066446 A1 | 5/2016 |

OTHER PUBLICATIONS

Busico, et al., "Microstructure of polypropylene", Prog. Polym. Sci. 26 (2001), pp. 443-533.
Busico, et al., "Full Assignment of the 13C NMR Spectra of Regioregular Polypropylenes: Methyl and Methylene Region", Macromolecules 1997, 30, pp. 6251-6263.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
H.N. Cheng, "13C NMR Analysis of Ethylene-Propylene Rubbers", Macromolecules 1984, 17, 1950-1955.
Resconi et al., "Selectivity in Propene Polymerization with Metallocene Catalysts", Chem. Rev. 2000, 100, pp. 1253-1345.
Wang et al., "Structural Analysis of Ethylene/Propylene Copolymers Synthesized with a Constrained Geometry Catalyst", Macromolecules 2000, 33, pp. 1157-1162.

(Continued)

Primary Examiner — Nathan M Nutter
(74) Attorney, Agent, or Firm — Tarolli, Sundheim, Covell & Tummino LLP

(57) ABSTRACT

The present invention relates to a nucleated heterophasic polypropylene composition, which shows improved properties in view of mechanical and optical behaviour as well as low amounts of extractable. The present invention also relates to films and final articles made out of the heterophasic polypropylene composition, as well as their use in packaging, especially food packaging applications.

10 Claims, No Drawings

(56) References Cited

OTHER PUBLICATIONS

Zhou et al., "A new decoupling method for accurate quantification of polyethylene copolymer composition and triad sequence distribution with 13C NMR", Journal of Magnetic Resonance 187 (2007) pp. 225-233.

Gahleitner, et al., "Heterophasic Copolymers of Polypropylene: Development, Design Principles, and Future Challenges", J. Appl. Polym. Sci. 2013.

* cited by examiner

HETEROPHASIC POLYPROPYLENE COMPOSITION WITH IMPROVED MECHANICAL AND OPTICAL PROPERTIES

The present invention relates to nucleated heterophasic polypropylene compositions, which show improved properties in view of mechanical and optical behaviour as well as low amounts of extractable substances.

The present invention also relates to films, sheets or other final articles made out of the heterophasic polypropylene composition, as well as their use in packaging, especially food packaging applications.

BACKGROUND INFORMATION

Heterophasic polymers are polymers having a matrix phase and a disperse phase. The matrix phase is usually a propylene homopolymer or propylene/ethylene and/or α-olefin copolymer phase and the disperse phase is usually an ethylene/α-olefin rubber copolymer.

Heterophasic propylene copolymers are well established in a lot of applications throughout the polymer and packaging industry because of their good stiffness/impact balance together with acceptable optical properties. Heterophasic polypropylene compositions normally show a low amount of extractable substances and can therefore be used for applications where low amounts of volatiles are needed.

For all such applications it is a continuous request by the industry to have products at hand that show better stiffness, better optical behaviour, better impact behaviour and lower amounts of extractable substances at the same time.

Polymers with higher stiffness can be converted into articles with lower wall thickness, allowing material and energy savings.

Polymers with good optical properties, especially low haze, are desired for consumer related articles to provide good "see-through" properties on the content of the packed goods.

Polymers with low amounts of extractables are especially desired in food related applications, e.g. for food packaging, boil-in-the-bag-applications, etc. Other desires for food related applications deal with the opening behaviour ("easy tear"), while still keeping the content safe before opening.

The demands can be challenging, since many polymer properties are directly or indirectly interrelated, i.e. improving a specific property can only be accomplished at the expense of another property.

Stiffness can for instance be improved by increasing the crystallinity and/or the relative amount of homopolymer within the composition. As a consequence, the material becomes more brittle, thereby resulting in poor impact properties and/or worse optical properties.

Heterophasic propylene copolymers have a good impact strength over a wide temperature range but this normally goes together with rather low transparency. Impact strength is mainly influenced by the amount of rubber, its molecular weight and its composition.

It is generally known that on top of the amount of rubber its molecular weight respectively intrinsic viscosity as well as the comonomer content affect the mechanical and optical performance. As explained e.g. in the paper of Gahleitner et al., J. Appl. Polym. Sci. 130 (2013) 3028-3037, the increase of the rubber amount is the only straightforward parameter in this context. The relative comonomer content in the rubber phase affects the phase structure as well as the impact strength in complex ways, and the molecular weight of the rubber phase has a highly nonlinear effect on impact strength in addition depending on the geometry. All three parameters also define the amount of extractable substances.

DESCRIPTION OF THE PRIOR ART

WO2004/055101 relates to a flat film for thermoforming with high toughness, high stiffness and high transparency, comprising a polyolefin composition and an alpha-nucleating agent. The optical properties, especially haze, are high as are the given values for hexane extractables via FDA method ($C6_{FDA}$).

EP1661935 relates to a cast film or blown film comprising a composition comprising 80 to 95 wt % of a polypropylene matrix (A) with an MFR of 1 to 30 g/10 min being a homopolymer or a copolymer, which has a comonomer content of less than 3 wt.-%, 5 to 20 wt.-% of an ethylene-propylene-rubber (EPR) (B) with at least 55 wt.-% propylene and having an intrinsic viscosity (IV) of 1 to 2.5 dl/g and 0.0001 to 1 wt.-% of an nucleating agent. These materials are quite soft and show relative high amounts for hexane extractables via FDA method ($C6_{FDA}$).

EP1801156A1 discloses polyolefin compositions for packaging applications, the compositions comprising a heterophasic propylene copolymer comprising a propylene random copolymer matrix, a dispersed phase comprising an elastomeric propylene copolymer, a polymeric nucleating agent and a low-density polyethylene. The low-density polyethylene is introduced in order to improve the transparency as an alternative for polymeric or low-molecular weight nucleating agents for use in the master batch technology. The compositions show good impact and haze properties. However the stiffness (i.e. tensile modulus) and thus the stiffness/impact balance is not sufficient. Moreover the document is totally silent about the amount of extractable substances.

All heterophasic polypropylene compositions mentioned above are produced using a Ziegler-Natta catalyst, in particular a high yield Ziegler-Natta catalyst (so called fourth and fifth generation type to differentiate from low yield, also known as second generation Ziegler-Natta catalysts), which comprises a catalyst component, a co-catalyst component and an internal donor based on phthalate-compositions.

However, some of such phthalate-compositions are under suspicion of generating negative health and environmental effects and will probably be banned in the future. Furthermore, there is an increasing demand on the market for "phthalate-free polypropylene" suitable for various applications, e.g. in the field of packaging, food and medical applications.

WO 2016066446 A1 as well as EP 3015504 A1 both concern heterophasic polypropylene compositions based on a non-phthalate Ziegler-Natta catalyst with a citraconate ester as internal donor. The claimed compositions are however not suitable for highly transparent packaging applications.

WO2015/197434A1 discloses nucleated polypropylene compositions for packaging applications, the compositions comprising at least one propylene homopolymer, at least one propylene-copolymer-rubber phase, wherein the copolymer is ethylene or a C4 to 010 alpha-olefin and a polymeric nucleating agent. The compositions have been polymerised in the presence of a phthalate free Ziegler-Natta catalyst. Mechanical properties of the compositions are good, however with the comonomer content of the C3/C2 rubber phase being up to 65% the amount of extractable substances will not be satisfying. In fact, the document is silent about both the extractables and the optical properties.

OBJECT OF THE INVENTION

It was hence an object of the present invention to provide a heterophasic polypropylene composition, which shows higher values in stiffness (i.e. Flexural or Tensile Modulus) than the materials known in the art, but still have similar or higher values in Impact behaviour (such as Dart Drop Impact, DDI, or Charpy Impact tests), as well as similar or better optical properties, while extractables are kept at a known low or a lower level then known up to now.

It was a further object of the present invention to provide a heterophasic polypropylene composition that can be converted into both blown films or cast films, wherein these films are also characterized by improved stiffness, while impact, optical behaviour or extractables are kept at known levels or are slightly improved.

Still another object of the present invention is to provide heterophasic polypropylene compositions, which after conversion to films show improved stiffness, as well as easy tear features and low extractables while impact and optical behaviour kept at known levels.

The invention is based on the surprising finding that the above mentioned object can be achieved by providing a heterophasic polypropylene composition characterised by an MFR230/2.16 according to ISO1133 of at most 6.0 g/10 min and comprising
  a. ≥80.0 wt.-% of a polypropylene homopolymer and
  b. <20.0 wt.-% of an elastomeric ethylene-propylene rubber fraction,
  c. a polymeric nucleating agent and
  d. at least one further nucleating or clarifying agent
wherein the heterophasic polypropylene composition is further characterized by a xylene soluble fraction (XCS) of 5.0 to 20.0 wt.-% and in that the elastomeric ethylene-propylene rubber fraction (b) has an C2(XCS) of 20.0 to 38.0 wt.-%.

In a special embodiment the present invention envisages extruded articles, like e.g. films, sheets or tapes, bags or pouches made out of the heterophasic polypropylene composition of the present invention.

In a further special embodiment the present invention envisages the use of such articles made out of the heterophasic polypropylene composition of the present invention, preferably in alimentary packaging.

DETAILED DESCRIPTION

The heterophasic polypropylene composition of the present invention is characterised by a melt flow rate MFR 230° C./2.16 kg, measured according to ISO1133 of at most 6.0 g/10 min, such as 5.0 g/10 min or lower like 4.5 g/10 min or lower.

Preferably the MFR 230° C./2.16 kg is at least 1.5 g/10 min, such as at least 2.0 g/10 min or at least 2.5 g/10 min.

Preferred ranges for the MFR of the heterophasic polypropylene composition of the present invention are 1.5 to 6.0 g/10 min, 2.0 to 5.0 g/10 min or 2.5 to 4.5 g/10 min.

The heterophasic polypropylene composition of the present invention may comprise an amount of comonomer in the range of 2.0 to 6.0 wt.-%, such as 2.5 to 5.9 wt.-%, preferably 2.6 to 5.8 wt.-%.

The comonomers present in the heterophasic polypropylene composition of the present invention can be ethylene and/or a C4-C10 alpha-olefin like 1-butene, 1-pentene, 1-hexene, 1-heptene, 1-octene etc. or a mixture thereof. It is especially preferred that the comonomer is ethylene.

The heterophasic polypropylene composition of the present invention comprises at least 80.0 wt.-% of a propylene homopolymer (a), preferably at least 82.0 wt.-%, more preferably at least 83.0 wt.-%.

The heterophasic polypropylene composition of the present invention may comprise up to 95.0 wt.-% of the propylene homopolymer (a), preferably up to 94.0 wt.-% and more preferably up to 93.0 wt.-%.

Preferably the propylene homopolymer (a) is present in the heterophasic polypropylene composition of the present invention with 80.0 to 95.0 wt.-%, like 82.0 to 94.0 wt.-%, such as 83.0 to 93.0 wt.-%.

In the context of the present invention the propylene homopolymer (a) is understood to comprise up to 1.0 wt.-% of comonomers different to propylene, preferably up to 0.5 wt.-%, such as up to 0.3 wt.-%.

The comonomers present in the propylene homopolymer (a) can be ethylene and/or a C4-C10 alpha-olefin like 1-butene, 1-pentene, 1-hexene, 1-heptene, 1-octene etc. or a mixture thereof. Especially preferred is that in the present invention the comonomer is ethylene.

Alternatively preferred is that the propylene homopolymer (a) consists of propylene monomer units only.

The heterophasic polypropylene composition of the present invention comprises less than 20 wt.-% of a disperse phase comprising an ethylene propylene rubber (b), preferably up to 18.0 wt.-%, more preferably up to 17.0 wt.-%.

The heterophasic polypropylene composition of the present invention may comprise at least 5.0 wt.-% of the ethylene propylene rubber (b), preferably at least 6.0 wt.-%, more preferably at least 7.0 wt.-%.

The heterophasic polypropylene composition of the present invention comprises a matrix being a propylene homopolymer (a) and dispersed therein an ethylene propylene rubber (b). Thus the matrix contains (finely) dispersed inclusions being not part of the matrix and said inclusions contain the ethylene propylene rubber (b). The term inclusion indicates that the matrix and the inclusion form different phases within the heterophasic polypropylene composition. The presence of second phases or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

The heterophasic polypropylene composition of the present invention thus exhibits at least two glass transitions (Tg) in DMTA at significantly different temperatures. One Tg related to the propylene homopolymer (a) component is located in the range of −5.0 to 5.0° C., another Tg related to the ethylene propylene rubber (b) is located in the range of −55 to −35° C.

According to one preferred embodiment (I), the heterophasic polypropylene composition comprises 88.0 to 93.0 wt.-% of the polypropylene homopolymer (a) and 7.0 to 12.0 wt.-% of ethylene propylene rubber (b). The respective compositions combine a higher stiffness with a limited, but sufficient impact strength.

According to another preferred embodiment (II), the heterophasic polypropylene composition comprises 82.0 to 85.5 wt.-% of the polypropylene homopolymer (a) and 14.5 to 18.0 wt.-% of ethylene propylene rubber (b). The respective compositions combine higher impact strength with a limited, but satisfying stiffness.

The term "ethylene-propylene rubber phase" denotes the material which is essentially dispersed in the matrix and is soluble in p-xylene under the conditions described as xylene cold soluble (XCS) fraction.

The ethylene-propylene rubber phase is preferably composed of propylene and ethylene monomer units, wherein ethylene monomer units are present in an amount of at most 40.0 wt.-%, like in the range of 20.0 to 38.0 wt.-%, preferably in the range of 22.0 to 37.0 wt.-%, more preferably in the range of 24.0 to 36.0 wt.-%, expressed as ethylene content of the xylene cold solubles fraction C2(XCS).

The heterophasic polypropylene composition of the present invention may have a fraction soluble in cold xylene (XCS) in the range of 5.0 to 20.0 wt.-%, preferably in the range of 6.0 to 19.0 wt.-%, more preferably in the range of 7.0 to 18.0 wt.-%.

According to one preferred embodiment (I), the heterophasic polypropylene composition has an XCS fraction in the range of 7.0 to 12.0 wt.-%.

According to another preferred embodiment (II), the heterophasic polypropylene composition has an XCS fraction in the range of 14.5 to 18.0 wt %.

The amount of extractables in hexane according to FDA method (hexane soluble value $C6_{FDA}$) in the heterophasic polypropylene composition is at most 2.0 wt.-%, such as at most 1.9 wt.-% or at most 1.8 wt.-%. It may be in ranges like 0.8 to 1.9 wt.-%, or 1.0 to 1.8 wt.-%.

The Flexural Modulus of the heterophasic polypropylene composition of the present invention, when determined according to ISO 178, is in the range of 1000 to 2000 MPa, preferably in the range of 1100 to 1900 MPa, more preferably in the range of 1200 to 1750 MPa.

The Charpy notched impact strength NIS+23° C. is determined according to ISO179/1eA at +23° C. In the heterophasic polypropylene composition of the invention the NIS+23° C. is at least 10 kJ/m$^2$, preferably at least 11.5 kJ/m$^2$. The NIS+23° C. will normally not exceed 80 kJ/m$^2$.

The heterophasic polypropylene composition of the present invention can be further defined by its combined stiffness/impact performance:

According to one preferred embodiment (I) the heterophasic polypropylene composition of the present invention is characterised by a Flexural Modulus in a range of 1500 to 1750 MPa and a Charpy notched impact strength NIS+23° C. in the range of 11.5 to 25.0 kJ/m$^2$.

According to another preferred embodiment (II) the heterophasic polypropylene composition of the present invention is characterised by a Flexural Modulus in the range of 1200 to 1400 MPa and a Charpy notched impact strength NIS+23° C. in the range of 30.0 to 80.0 kJ/m$^2$.

Alternatively, the heterophasic polypropylene composition of the present invention can be further defined via its low amounts of extractables in hexane according to FDA method ($C6_{FDA}$) and the still good impact behaviour:

Thus, the heterophasic polypropylene composition of the present invention is characterised by a $C6_{FDA}$ level of at most 2.0 wt.-% and a Charpy notched impact strength NIS+23° C. of at least 11.5 kJ/m$^2$.

Propylene Homopolymer (a)

In the context of the present invention the propylene homopolymer (a) is understood to comprise up to 1.0 wt.-% of comonomers different to propylene, preferably up to 0.5 wt.-%, more preferably up to 0.3 wt.-%.

The comonomers present in the propylene homopolymer (a) can be ethylene and/or a C4-C10 alpha-olefin like 1-butene, 1-pentene, 1-hexene, 1-heptene, 1-octene etc. or a mixture thereof. It is especially preferred that in the present invention the comonomer is ethylene.

It is alternatively preferred that the propylene homopolymer (a) consists of propylene monomer units only.

The propylene homopolymer (a) is an isotactic polypropylene characterized by high isotacticity. Preferably, the pentad isotacticity <mmmm> determined by $^{13}$C nuclear magnetic resonance spectroscopy ($^{13}$C-NMR) is at least 96%.

It is preferred that the propylene homopolymer (a) has a high melting point as determined by differential scanning calorimetry (DSC). Said melting point Tm will be at least 160° C., preferably in the range of 162 to 170° C.

It is further preferred that the propylene homopolymer (a) has a melt flow rate MFR 230° C./2.16 kg in the range of 1.0 to 6.0 g/10 min, preferably in the range of 1.5 to 4.5 g/10 min, more preferably in the range of 2.0 to 3.5 g/10 min. As the MFR is related to the intrinsic viscosity (IV) of the propylene homopolymer (a) via its molecular weight, it is further preferred to have an IV as measured according to ISO 1628/1 in decalin at 135° C. in the range of 2.5 to 3.4 dl/g, more preferably in the range of 2.6 to 3.2 dl/g, even more preferably in the range of 2.7 to 3.1 dl/g.

The polypropylene homopolymer (a) may comprise or consist of a single polypropylene homopolymer fraction (=unimodal), but may also comprise a mixture of different polypropylene homopolymer fractions.

In cases where the polypropylene homopolymer (a) comprises different fractions, the polypropylene homopolymer (a) is understood to be bi- or multimodal.

These fractions may have different average molecular weight, different molecular weight distribution, or different quality and/or quantity of comonomer.

It is preferred that the polypropylene homopolymer (a) can be bimodal or multimodal in view of molecular weight, molecular weight distribution or comonomer quality and/or quantity or several of these.

It is alternatively preferred that the polypropylene homopolymer (a) can be unimodal in view of average molecular weight and/or molecular weight distribution or comonomer content or quality.

Preferably the propylene homopolymer (a) is present in the heterophasic polypropylene composition of the present invention in a range of 80.0 to 95.0 wt.-%, like 82.0 to 94.0 wt.-%, such as 83.0 to 93.0 wt.-%.

According to one preferred embodiment (I), the heterophasic polypropylene composition comprises 88.0 to 93.0 wt.-% of the propylene homopolymer (a). The respective compositions combine a higher stiffness with a limited, but sufficient impact strength. According to another preferred embodiment (II), the heterophasic polypropylene composition comprises 82.0 to 85.5 wt.-% of the propylene homopolymer (a). The respective compositions combine a higher impact strength with a limited, but sufficient stiffness.

Ethylene-Propylene Rubber (b)

The heterophasic polypropylene composition of the present invention comprises less than 20 wt.-% of a dispersed phase comprising an ethylene propylene rubber (b), preferably up to 19.0 wt.-%, more preferably up to 18.0 wt.-%.

The heterophasic polypropylene composition of the present invention comprises at least 5.0 wt.-% of the ethylene propylene rubber (b), preferably at least 6.0 wt.-%, more preferably at least 7.0 wt.-%.

According to one preferred embodiment (I), the heterophasic polypropylene composition comprises 7.0 to 12.0 wt.-% of ethylene propylene rubber (b). The respective compositions combine a higher stiffness with a limited, but sufficient impact strength.

According to another preferred embodiment (II), the heterophasic polypropylene composition comprises 14.5 to 18.0 wt.-% of ethylene propylene rubber (b). The respective compositions combine a higher impact strength with a limited, but sufficient stiffness.

The term "ethylene-propylene rubber phase" denotes the material which is essentially dispersed in the matrix and is soluble in p-xylene under the conditions described as XCS (xylene cold solubles).

The ethylene-propylene rubber phase is preferably composed of propylene and ethylene monomer units, wherein ethylene monomer units are present in an amount of at most 40.0 wt.-%, like in the range of 20.0 to 38.0 wt.-%, more preferably in the range of 22.0 to 37.0 wt.-%, such as 24.0 to 36.0 wt.-%. The ethylene content in the ethylene-propylene rubber phase is expressed as C2(XCS).

The ethylene-propylene rubber phase is characterised by an intrinsic viscosity as measured according to ISO 1628/1 in decalin at 135° C. (IV) of at least 1.4 dl/g, as for example in the range of 1.4 to 2.1 dl/g, preferably in the range of 1.5 to 2.0 dl/g, more preferably in the range of 1.6 to 2.0 dl/g.

According to a preferred embodiment the heterophasic polypropylene composition of the present invention is characterised in that the polypropylene homopolymer (a) has a melt flow rate MFR230/2.16 according to ISO1133 in the range of 1.0 to 6.0 g/10 min and an intrinsic viscosity (IV) according to ISO1628/1 in the range of 2.5 to 3.4 dl/g and that the elastomeric ethylene-propylene rubber fraction (b) has an intrinsic viscosity IV according to ISO1628/1 in the range of 1.4 to 2.1 dl/g.

Ethylene-propylene rubbers (EPR) can either be synthesized in the later step(s) of a multistage process, after the polypropylene homopolymer (a) has been synthesized.

Alternatively, ethylene-propylene rubber can be polymerised separately and mixed with the random copolymer and the homopolymer component in a separate melt blending step.

It is preferred, that the incorporation of the EPR into the polypropylene homopolymer is done during a multistage polymerisation process.

Polymeric Nucleating Agent (c)

The heterophasic polypropylene composition of the present invention also comprises a polymeric nucleating agent (c).

The polymeric nucleating agent of the heterophasic polypropylene composition of the present invention can be polymerised vinyl compounds, in particular vinyl cycloalkanes, like vinyl cyclohexane (VCH), poly(vinyl cyclohexane) (PVCH), vinylcyclopentane, and vinyl-2-methyl cyclohexane, 3-methyl-1-butene, 3-ethyl-1-hexene, 3-methyl-1-pentene, 4-methyl-1-pentene or mixtures thereof. PVCH is particularly preferred.

Polymeric nucleating agents c) can either be incorporated by in-reactor nucleation or by the so called Masterbatch technology (compounding technology) as mentioned below.

In a preferred embodiment of the present invention, the polymeric nucleating agent is introduced into the polypropylene homopolymer by means of a suitably modified catalyst, into the reactor (i.e. in-reactor nucleation, so called BNT technology) i.e. the catalyst to be used in catalysing the polymerisation of any of the polypropylene homopolymer a) or the ethylene-propylene rubber b), is subjected to a polymerisation of a suitable monomer for the polymeric nucleating agent to produce first said polymeric nucleating agent (pre-polymerisation step). The catalyst is then introduced together with the obtained polymeric nucleating agent to the actual polymerisation step of the heterophasic polypropylene composition.

In a particularly preferred embodiment of the present invention, the propylene polymer is prepared in the presence of such a modified catalyst to obtain said reactor made polypropylene homopolymer. With such modified catalyst, it is also possible to carry out the above-identified preferred polymerisation sequence for the preparation of in-situ blended multimodal, including bimodal, polypropylenes.

In case of applying in-reactor nucleation, the inventive composition comprises a propylene homopolymer received from a step of pre-polymerisation which is carried out before the polymerisation of the first fraction as defined above. More preferably, said fraction is a propylene homopolymer fraction.

Another embodiment, different to the above mentioned in-reactor blend, is a mechanical blend of a polymer with a nucleating agent, wherein the polymer is first produced in the absence of a polymeric nucleating agent and is then blended mechanically with the polymeric nucleating agent or with a small amount of nucleated polymer or with polymers, which already contain the polymeric nucleating agent (so-called master batch technology) in order to introduce the polymeric nucleating agent into the polymer mixture. The preparation of a reactor made polymer composition ensures the preparation of a homogenous mixture of the components, for example a homogenously distributed polymeric nucleating agent in the polypropylene homopolymer, even at high concentrations of polymer nucleating agent.

As outlined above, the reactor made polymer composition is a preferred embodiment of the present invention, although also mechanical blends prepared, for example, by using master batch technology are envisaged by the present invention.

Further Nucleating or Clarifying Agent (d)

The heterophasic polypropylene composition of the present invention comprises—in addition to the polymeric nucleating agent—at least one further nucleating or clarifying agent.

This at least one further nucleating or clarifying agent (d) may be selected from the groups of particular and/or soluble nucleating or clarifying agents.

Particular nucleating or clarifying agents comprise the groups of (i) monocarboxylic acids and polycarboxylic acids or (ii) salts of diesters of phosphoric acid.

Soluble nucleating or clarifying agents comprise substances listed in group (iii), namely sorbitol derivatives.

Particular and soluble nucleating or clarifying agents are equally preferred.

Alternatively, this at least one further nucleating or clarifying agent (d) may be selected from the groups comprising (i) salts of monocarboxylic acids and polycarboxylic acids, e.g. sodium benzoate or aluminum tert-butylbenzoate; or 1,2-cyclohexane dicarboxylicacid Ca-salt, of which the 1,2-cyclohexane dicarboxylicacid Ca-salt is especially preferred;

(ii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and hydroxybis (2,4,8,10-tetra-tert-butyl-6-hydroxy-12Hdibenzo(d,g)(1,3,2) dioxaphosphocin 6-oxidato) aluminium, wherein hydroxybis (2,4,8,10-tetra-tert-butyl-6-hydroxy-12H-dibenzo(d,g)(1,3,2) dioxaphosphocin 6-oxidato) aluminium is preferred, (iii) soluble nucleating agents, like sorbitol derivatives, e.g. di(alkylbenzylidene)sorbitols as 1,3:2,4-25 dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl)methylene] nonitol, and benzene-trisamides like substituted 1,3,5-benzenetrisamides as N,N',N''-tris-tert-butyl-1,3,5-benzenetricarboxamide, N,N',N''-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-di(4-methylbenzylidene) sorbitol and N-[3,5-bis-(2,2-dimethyl-propionylamino)-phenyl]-2,2-dimethyl-propionamide are equally preferred.

The incorporation of the at least one further nucleating or clarifying agent (d) into the heterophasic polypropylene composition of the present invention is preferably effected together with the additives normally used with polyolefins; the incorporation is for example done via melt blending, compounding or pelletizing.

It is especially preferred, that the nucleating agents, that is the polymeric nucleating agent (c) and the at least one further nucleating or clarifying agent (d) present in the heterophasic polypropylene composition of the present invention are PVCH (polymeric nucleating agent c) and 1,2-cyclohexane dicarboxylicacid, Ca-salt (further nucleating or clarifying agent d).

It is further preferred, that the nucleating agents present in the heterophasic polypropylene composition of the present invention consist of PVCH and 1,2-cyclohexane dicarboxylicacid, Ca-salt.

Polymerisation Process

The heterophasic polypropylene composition in accordance with the present invention may be prepared by any suitable process, including in particular blending processes such as mechanical blending including mixing and melt blending processes and any combinations thereof as well as in-situ blending during the polymerisation process of the propylene polymer component(s). These can be carried out by methods known to the skilled person, including batch processes and continuous processes.

A preferred multistage process is a "loop-gas phase"-process, such as developed by Borealis NS, Denmark (known as BORSTAR® technology) is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Catalyst System

A possible catalyst for being used in the production of the heterophasic polypropylene composition of the present invention is described herein:

The catalyst is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is in a preferred embodiment completely free of undesired phthalic compounds. It is likewise preferred that the heterophasic polypropylene composition of the present invention is free of phthalic acid esters as well as their respective decomposition products.

Further, the solid catalyst is free of any external support material, like silica or $MgCl_2$, but the catalyst is self-supported.

The Ziegler-Natta catalyst can be further defined by the way as obtained. Accordingly, the Ziegler-Natta catalyst is preferably obtained by a process comprising the steps of a)

$a_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or $a_2$) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; or $a_4$) providing a solution of Group 2 alkoxide of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m+(2-n-m)=2$, provided that both n and $m \neq 0$, $0 < n' \leq 2$ and $0 < m' \leq 2$; and b) adding said solution from step a) to at least one compound (TC) of a transition metal of Group 4 to 6 and c) obtaining the solid catalyst component particles, and adding an internal electron donor (ID), preferably a non-phthalic internal donor (ID), at any step prior to step c).

The internal donor (ID) or precursor thereof is thus added preferably to the solution of step a) or to the transition metal compound before adding the solution of step a).

According to the procedure above the Ziegler-Natta catalyst (ZN-C) can be obtained via precipitation method or via emulsion-solidification method depending on the physical conditions, especially temperature used in steps b) and c). Emulsion is also called in this application liquid/liquid two-phase system.

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx), especially the solution of $a_2$).

Preferably the Group 2 metal (MC) is magnesium.

The magnesium alkoxy compounds as defined above can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably C6 to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, most preferably 4.1 to 1:4.

Magnesium alkoxy compound may be a reaction product of alcohol(s), as defined above, and a magnesium compound selected from dialkyl magnesium, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesium are used. Most preferred dialkyl magnesium are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesium, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilisers, like surfactants, which are used in a manner known in the art for facilitating the formation of and/or stabilise the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane and or with $TiCl_4$. Washing solutions can also contain donors and/or compounds of Group 13, like trialkyl aluminum, halogenated alky aluminum compounds or alkoxy aluminum compounds. Aluminum compounds can also be added during the catalyst synthesis. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 2610270 and EP2610272.

The Ziegler-Natta catalyst (ZN-C) is preferably used in association with an alkyl aluminum cocatalyst and optionally external donors.

According to a preferred embodiment the heterophasic polypropylene composition according is polymerised in the presence of a Ziegler-Natta catalyst, wherein the Ziegler Natta catalyst comprises
  a. compounds of a transition metal (TC) of Group 4 to 6 of IUPAC,
  b. a Group 2 metal compound (MC) and
  c. an internal donor (ID), wherein said internal donor is a non-phthalic compound, preferably is a non-phthalic acid ester
  d. a co-catalyst, and
  e. optionally an external donor.

As further component in the instant polymerisation process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula $R^a_p R^b_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula $Si(OCH_2CH_3)_3(NR^3R^4)$ wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt. % with respect to the triethyl aluminium (TEAL). More preferably, the hydride content is less than 0.5 wt. %, and most preferably the hydride content is less than 0.1 wt. %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly, the mole ratio of co-catalyst (Co) to external donor (ED) [Co/ED] must be in the range of 5 to 45, preferably is in the range of 5 to 35, more preferably is in the range of 5 to 25; and optionally the mole ratio of co-catalyst (Co) to titanium compound (TC) [Co/TC] must be in the range of above 80 to 500, preferably is in the range of 100 to 350, still more preferably is in the range of 120 to 300.

As mentioned above the Ziegler-Natta catalyst (ZN-C) is preferably modified by the so-called BNT-technology during the above described pre-polymerisation step in order to introduce the polymeric nucleating agent.

Such a polymeric nucleating agent can be, as described above, a vinyl polymer, such as a vinyl polymer derived from monomers of the formula

CH2=CH—CHR1R2 wherein R1 and R2, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched C4-C30 alkane, C4-C20 cycloalkane or C4-C20 aromatic ring. Preferably R1 and R2, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerisation catalyst in the modification step of the polymerisation catalyst preferably is 0.3 or more up to 40, such as 0.4 to 20 or more preferably 0.5 to 15, like 0.5 to 2.0.

The polymerisation of the vinyl compound, e. g. VCH, can be done in any inert fluid that does not dissolve the polymer formed (e. g. PVCH). It is important to make sure that the viscosity of the final catalyst/polymerised vinyl compound/inert fluid mixture is sufficiently high to prevent the catalyst particles from settling during storage and transport.

The adjustment of the viscosity of the mixture can be done either before or after the polymerisation of the vinyl compound. It is, e. g., possible to carry out the polymerisation in a low viscosity oil and after the polymerisation of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerised vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerisation of a vinyl compound should be sufficient to allow for complete reaction of the vinyl monomer, i. e. the polymerisation is continued until the amount of unreacted vinyl compounds in the reaction mixture (including the polymerisation medium and the reactants) is less than 0.5 wt-%, in particular less than 2000 ppm by weight (shown by analysis). Thus, when the prepolymerised catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerisation time of at least 30 minutes is required, preferably the polymerisation time is at least I hour and in particular at least 5 hours. Polymerisation times even in the range of 6 to 50 hours can be used. The modification can be done at temperatures of 10 to 70° C., preferably 35 to 65° C.

According to the invention, nucleated high-stiffness propylene polymers are obtained when the modification of the catalyst is carried out in the presence of strongly coordinating external donors.

General conditions for the modification of the catalyst are also disclosed in WO 00/6831, incorporated herein by reference with respect to the modification of the polymerisation catalyst. The preferred embodiments as described previously in the present application with respect to the vinyl compound also apply with respect to the polymerisation catalyst of the present invention and the preferred polypropylene composition in accordance with the present invention. Suitable media for the modification step include, in addition to oils, also aliphatic inert organic solvents with low viscosity, such as pentane and heptane. Furthermore, small amounts of hydrogen can be used during the modification.

Within the term "heterophasic polypropylene composition" in the meaning of the present inventions, it is understood, that the composition still may comprise the usual additives for utilization with polyolefins, such as pigments (e.g. TiO2 or carbon black), stabilisers, acid scavengers and/or UV-stabilisers, lubricants, antistatic agents, further nucleating agents and utilization agents (such as processing aid agents, adhesive promotors, compatibiliser, etc.) The amount of such additives usually is 10 wt. % or less, preferably 5 wt. % or less. As mentioned before together with the additives the at least one further nucleating or clarifying agent (d) is introduced into the heterophasic polypropylene composition of the present invention.

Articles and Use:

In a special embodiment the present invention envisages extruded articles, e.g. films, sheets, e.g. sheets for thermofoming processes, tapes, bags or pouches made out of, hence comprising the heterophasic polypropylene composition of the present invention.

In a further special embodiment the present invention envisages articles like packaging articles comprising extruded articles comprising the heterophasic polypropylene composition of the present invention. Especially preferred are final articles, such as packaging articles, which exhibit easy-tear-properties, meaning a reduced tear propagation strength in at least one direction.

The present invention is also directed to the use of the heterophasic polypropylene composition in packaging applications. In another further special embodiment the present invention envisages the use of such extruded articles made out of the heterophasic polypropylene composition of the present invention in packaging or thermoforming processes, preferably in alimentary packaging.

Films comprising the heterophasic polypropylene composition of the present invention can be produced with several known conversion techniques, such as extrusion via blown or cast film technology, wherein both blown and cast films are equally preferred.

Films according to the present invention may be subjected to post-treatment processes, e.g. lamination or orientation processes or surface treatments like corona treatment.

Orientation processes can be mono-axially (MDO) or bi-axially orientation, wherein monoaxial orientation or biaxial orientation are equally preferred.

The films according to the present invention can have a thickness in the range at most 60 μm or 55 μm or below. Preferred are films having a thickness of 10 μm or higher, such at least 15 μm, 20 μm or higher such as 25 μm or higher. Very preferred are films having film thicknesses of 10 to 55 μm, such as 15 to 50 μm Very especially preferred are films having a thickness of 10 to 40 μm, such as 15 to 35 μm. Equally preferred are films having a thickness of 30 to 60 μm, such as 35 to 55 μm, like 45 to 55 μm.

Cast films or sheets for thermoforming processes comprising the heterophasic polypropylene composition of the present invention can have a thickness of 100 to 500 μm, such as 150 to 400 μm or 200 to 350 μm.

Both blown and cast films as well as sheets according to the present invention may have mono- or multilayer structures, comprising one or more layers, like two, three or five layers, even up to seven, up to 9 or up to 12 layers.

In multilayer structures the heterophasic polypropylene composition according to the present invention may be contained by at least one of the layers or by more than one layer, like two or three layers of the multilayer film. It may be also comprised by all layers of the multilayer film.

It is within the scope of the present invention, that a monolayer structure may comprise 1 to 100 wt.-% of the heterophasic polypropylene composition according to the present invention. It is preferred, that such monolayer film comprise 10 to 90 wt.-%, such as 30 to 70 wt.-%, or like 40 to 60 wt.-% or 45 to 55 wt.-% of the heterophasic polypropylene composition according to the present invention.

It is further within the scope of the present invention, that in case of multilayer films each layer independently from the others may comprise 1 to 100 wt. % of the heterophasic polypropylene composition according to the present invention. It is preferred, that each layer independently from the others comprises 10 to 100 wt. %, such as 30 to 80 wt. %, or like 40 to 65 wt. % or 45 to 55 wt. % of the heterophasic polypropylene composition according to the present invention.

Mechanical and Optical Properties on Films

It is within the scope of the invention, that the films are characterized by a high stiffness and good transparency. Thus, the tensile modulus as determined according to ISO 527-3 in machine direction (tensile modulus MD) shall be in the range of 700 to 1700 MPa, preferably in the range of 800 to 1600 MPa. The haze values determined on 50 μm cast films ($Haze_{C50}$) shall be 10.0% or below, such as at most 9.0, such as at most 8.0 or below.

It is further within the scope of the invention, that the films comprising the heterophasic polypropylene composition of the present invention have low amounts of Hexane soluble polymer ($C6_{FDA}$), of at most 2.0 wt.-%, such as at most 1.9 wt.-% or at most 1.8 wt.-%.

The amounts of Hexane soluble polymer ($C6_{FDA}$) may be in ranges like 0.8 to 1.9 wt.-%, or 1.0 to 1.8 wt.-%.

Films comprising the heterophasic polypropylene composition of the present invention show very good optical properties in the sense of low haze:

Within this application the following definitions are to be understood as given here:

Haze values are indicated with the conversion method of the article and its respective thickness:
- B indicates blown film, followed by the thickness in [μm]
- C indicates Cast film followed by the thickness in [μm]
- IM indicates injection moulding, followed by the thickness in [mm].

So a value for Haze$_{C50}$ has been measured on a 50 μm castfilm.

The haze values determined on 50 μm cast films (Haze$_{C50}$) shall be 10.0% or below, such as 9.0% or below, such as 8.0% or below.

In a further special embodiment the present invention envisages the use of such articles made out of the heterophasic polypropylene composition of the present invention, preferably in alimentary packaging.

The films according to the present invention are highly useful to being used in various packaging applications or for producing packaging articles, wherein applications related to food packaging are preferred.

Packaging articles comprising the heterophasic polypropylene composition of the current invention comprise bags, pouches, wrapping or collation films, and the like.

The present invention will now be described in further detail by the examples provided below:

EXAMPLES

Measuring Methods
Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR$_2$ of polypropylene is determined at a temperature of 230° C. and a load of 2.16 kg for polypropylenes.

Xylene Soluble Fraction and Amorphous Phase

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached.

The xylene soluble fraction (percent) can then be determined as follows:

$$XCS\% = (100 \times m_1 \times v_0)/(m_0 \times v_1),$$

wherein $m_0$ designates the initial polymer amount (grams), $m_1$ defines the weight of residue (grams), $v_0$ defines the initial volume (millilitre) and $v_1$ defines the volume of the analysed sample (millilitre).

The fraction insoluble in p-xylene at 25° C. (XCU) is then equal to 100%−XCS %.

The solution from the second 100 ml flask was treated with 200 ml of acetone under vigorous stirring. The precipitate was filtered and dried in a vacuum oven at 90° C. This solution can be employed in order to determine the amorphous part (AM) of the polymer (wt.-%) using the following equation:

$$AM = (100 \times m_1 \times v_0)/(m_0 \times v_1)$$

wherein $m_0$ designates the initial polymer amount (g), $m_1$ defines the weight of residue (g), $v_0$ defines the initial volume (ml) and $v_1$ defines the volume of the analysed sample (ml).

Intrinsic Viscosity (IV of XCS)

Intrinisic viscosity (IV of XCS) is measured according to DIN ISO 1628/1, October 1999 (in Decalin at 135° C.) on the xylene soluble fraction (XCS).

Quantification of Polypropylene Homopolymer Microstructure by NMR Spectroscopy

Quantitative nuclear-magnetic resonance (NMR) spectroscopy was used to quantify the isotacticity and content of regio-defects of the polypropylene homopolymers. Quantitative $^{13}C\{^1H\}$ NMR spectra recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm selective excitation probehead at 125° C. using nitrogen gas for all pneumatics. Approximately 200 mg of material was dissolved in 1,2-tetrachloroethane-d$_2$ (TCE-d$_2$). This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra using a 3 s recycle delay. Quantitative $^{13}C\{^1H\}$ NMR spectra were processed, integrated and relevant quantitative properties determined from the integrals using proprietary computer programs. All chemical shifts are internally referenced to the methyl signal of the isotactic pentad mmmm at 21.85 ppm.

The tacticity distribution was quantified through integration of the methyl region between 23.6 and 19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251). The pentad isotacticity was determined through direct integration of the methyl region and reported as either the mole fraction or percentage of isotactic pentad mmmm with respect to all steric pentads i.e. [mmmm]=mmmm/sum of all steric pentads. When appropriate integrals were corrected for the presence of sites not directly associated with steric pentads.

Characteristic signals corresponding to regio irregular propene insertion were observed (Resconi, L., Cavallo, L., Fait, A., Piemontesi, F., Chem. Rev. 2000, 100, 1253). The presence of secondary inserted propene in the form of 2,1 erythro regio defects was indicated by the presence of the two methyl signals at 17.7 and 17.2 ppm and confirmed by the presence of other characteristic signals. The amount of 2,1 erythro regio defects was quantified using the average integral (e) of the e6 and e8 sites observed at 17.7 and 17.2 ppm respectively, i.e. e=0.5*(e6+e8). Characteristic signals corresponding to other types of regio irregularity were not observed (Resconi, L., Cavallo, L., Fait, A., Piemontesi, F., Chem. Rev. 2000, 100, 1253). The amount of primary inserted propene (p) was quantified based on the integral of all signals in the methyl region (CH3) from 23.6 to 19.7 ppm paying attention to correct for other species included in the integral not related to primary insertion and for primary insertion signals excluded from this region such that p=CH3+2*e. The relative content of a specific type of regio defect was reported as the mole fraction or percentage of said regio defect with respect all observed forms of propene insertion i.e. sum of all primary (1,2), secondary (2,1) and tertiary (3,1) inserted propene units, e.g. [21e]=e/(p+e+t+i). The total amount of secondary inserted propene in the form of 2,1-erythro or 2,1-threo regio defects was quantified as sum of all said regio irregular units, i.e. [21]=[21e]+[21t].

Quantification of Copolymer Microstructure by NMR Spectroscopy

Quantitative nuclear-magnetic resonance (NMR) spectroscopy was used to quantify the comonomer content and comonomer distribution of the copolymers, specifically propene-co-ethylene copolymers. Quantitative $^{13}C\{^{1}H\}$ NMR spectra recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm selective excitation probehead at 125° C. using nitrogen gas for all pneumatics. Approximately 200 mg of material was dissolved in 1,2-tetrachloroethane-$d_2$ (TCE-$d_2$) with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). This setup was chosen primarily for the high resolution and quantitative spectra needed for accurate ethylene content determination. Standard single-pulse excitation was employed without NOE, using an optimised tip angle, 1 s recycle delay and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra. Quantitative $^{13}C\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present.

Characteristic signals corresponding to regio irregular propene insertion were observed (Resconi, L., Cavallo, L., Fait, A., Piemontesi, F., Chem. Rev. 2000, 100, 1253).].

Characteristic signals corresponding to the incorporation of ethylene were observed (Cheng, H. N., Macromolecules 17, 1984, 1950). The comonomer content was calculated as the mole fraction or percent of incorporated ethylene with respect to all monomer in the copolymer using the method of Wang et. al. (Wang, W-J., Zhu, S., Macromolecules 33, 2000, 1157) through integration of multiple signals spanning the whole spectral $^{13}C$ spectra. This analyse method was chosen for its robust nature and ability to account for the presence of regio irregular propene insertion when needed. Integral regions were slightly adjusted to increase applicability across the whole range of encountered comonomer contents.

For systems where only isolated ethylene incorporation (PPEPP) was observed the method of Wang et. al. was modified to reduce the influence of non-zero integrals used to quantify higher order comonomer sequences. In such cases the term for the absolute ethylene content was determined based upon only $E=0.5(S\beta\beta+S\beta\gamma+S\beta\delta+0.5(S\alpha\beta+S\alpha\gamma\square))$ or $E=0.5(I_H+I_G+0.5(I_C+I_D))$ using the same notation as Wang et. al. (Wang, W-J., Zhu, S., Macromolecules 33, 2000, 1157). The term used for absolute propylene content (P) was not modified and the mole fraction of ethylene calculated as $[E]=E/(E+P)$.

The comonomer content in weight percent was calculated from the mole fraction in the usual way i.e. [E wt.-%]=100*([E]*28.06)/(([E]*28.06)+((1-[E])*42.08)).

Hexane Soluble Polymer (C6$_{FDA}$)

The amount of hexane extractable polymer according to FDA method (federal registration, title 21, Chapter 1, part 177, section 1520, s. Annex B) was determined from films produced on a PM30 cast film extrusion line with about 220° C. melt temperature with LID=20 and a screw diameter of 30 mm (feed zone 4 D long, 5.8 mm deep, compression zone 10 D long, metering zone 6 D long, 2.3 mm deep utilising a screen pack 36-400-900-400 mesh/cm$^2$.) A 200 mm die with a 0.55 to 0.60 mm die gap, screw speed: 50 r/min, and chill roll temperature of water: both rolls 40° C. (heating-cooling unit), Air gap: 0.5 mm, Air knife blower air supply: 1 bar. The film thickness is 100 µm.

The amount of hexane soluble polymer is determined according to FDA method (federal registration, title 21, Chapter 1, part 177, section 1520, s. Annex B) from the film samples prepared as described above. The extraction was performed at a temperature of 50° C. and an extraction time of 2 hours.

DSC Analysis, Melting Temperature (Tm) Crystallization Temperature (Tc)

DSC parameters are measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature Tc and heat of crystallization (Hc) are determined from the cooling step, while melting temperature Tm and heat of fusion (Hf) are determined from the second heating step.

Flexural Modulus

The Flexural Modulus is determined in 3-point-bending according to ISO 178 on injection molded specimens of 80×10×4 mm$^3$ prepared in accordance with EN ISO 1873-2.

Charpy Impact Test (NIS)

The Charpy notched impact strength (NIS) was measured according to ISO 179 1eA at +23° C., using injection molded bar test specimens of 80×10×4 mm$^3$ prepared in accordance with EN ISO 1873-2.

Tensile Modulus and Elongation at Break

Tensile moduli in machine (MD) and transverse (TD) direction were determined acc. to ISO 527-3 on films with a thickness of 50 µm at a cross head speed of 100 mm/min.

Tear Resistance

The tear resistance is measured in machine direction (MD) and in transverse direction (TD) according to ISO 6383/2 on 50 µm blown films.

Dyna Test

The impact strength of films is determined by the Dynatest method according to ISO7725-2 at 23° C. on cast films of 50 µm thickness produced on a monolayer cast film line with a melt temperature of 220° C. and a chill roll temperature of 20° C. with a thickness of 50 µm. The value W$_{break}$" [J/mm] represents the relative total penetration energy per mm thickness that a film can absorb before it breaks divided by the film thickness. The higher this value the tougher the material.

Haze

Haze was determined according ASTM D1003 on blown or cast films with a thickness 50 µm.

Within this application the following definitions are to be understood as given here:

Haze values are indicated with the conversion method of the article and its respective thickness:

"B" indicates blown film, followed by the thickness in [µm]
"C" indicates Cast film followed by the thickness in [µm]
"IM" indicates injection moulding, followed by the thickness in [mm].

So a value for Haze$_{C50}$ indicates measurement on a 50 µm cast film.

Dart Drop Strength (DDI)

Dart-drop is measured using ASTM D1709, method A (Alternative Testing Technique) from the film samples. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

Material Description:

Polymer:

1a) Catalyst Preparation 3.4 litre of 2-ethylhexanol and 810 ml of propylene glycol butyl monoether (in a molar ratio 4/1) were added to a 20 reactor. Then 7.8 litre of a 20% solution in toluene of BEM (butyl ethyl magnesium) provided by Crompton GmbH were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml titanium tetrachloride was placed in a 300 ml reactor equipped with a mechanical stirrer at 25° C. Mixing speed was adjusted to 170 rpm. 26.0 ml of Mg-complex prepared above was added within 30 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed 5 times: Washings were made at 80° C. under stirring 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml toluene.

Wash 4: Washing was made with 60 ml of heptane.

Wash 5: Washing was made with 60 ml of heptane under 10 minutes stirring.

Afterwards stirring was stopped and the reaction mixture was allowed to settle for 10 minutes decreasing the temperature to 70° C. with subsequent siphoning, and followed by N$_2$ sparging for 20 minutes to yield an air sensitive powder.

1b) VCH Modification of the Catalyst 35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (external donor D) under inert conditions at room temperature. After 10 minutes 5.0 g of the catalyst prepared in 1a (Ti content 1.4 wt. %) was added and after additionally 20 minutes 5.0 g of vinylcyclohexane (VCH) was added.). The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

For polymerisation of the inventive Examples IE1, IE2, IE3, IE4 and IE5 the catalyst prepared according to the method of example 1a was modified with VCH in the same way as is described in example 1 b, only on a bigger scale. (Ti content of 3.0 wt. %). 41 liters of oil, 1.79 kg of TEAL, 0.79 kg of donor D, 5.5 kg of catalyst and 5.55 kg of VCH was used. The concentration of unreacted VCH in the oil/catalyst mixture after the reaction was 150 ppm weight.

All the inventive and comparative example were produced in a Borstar pilot plant with a prepolymerisation reactor, one slurry loop reactor and two gas phase reactors.

The solid catalyst was used in all cases along with triethyl-aluminium (TEAL) as cocatalyst and dicyclo pentyl dimethoxy silane (D-donor) as external donor. The aluminium to donor ratio was 5 mol/mol, the TEAL/Ti-ratio was 90 mol/mol.

Polymerisation conditions are indicated in table 1.

The comparative examples were polymerised in the presence of a Ziegler-Natta-Catalyst and an internal donor comprising DEHP (di-ethyl-hexyl-phthalate), without executing the VCH modification as of step 1.b above.

Comparative Example CE2 corresponds to E5 as disclosed in WO2004/055101, page 16. Comparative Example CE3 corresponds to E8 as disclosed in WO2004/055101, page 16. Comparative Example CE4 corresponds to E1 as disclosed in EP1661935A1, page 10.

All products were stabilised by melt mixing on a co-rotating twin-screw extruder at 200–230° C. with 0.2 wt.-% of Irganox B225 and 0.1 wt. % calcium stearate.

Blown Film Production

Inventive Example IE4 and Comparative example CE 4 were further processed on an air-cooled blown film line (type: Hosokawa Alpine HS 35 HT), with a blow-up ratio of 1:2.5 to a final film thickness of 50 µm.

It was observed that the ratio between the tear strength in transverse direction (Tear TD) and machine direction (Tear MD) is rather high.

This is another benefit of the heterophasic polypropylene composition of the present invention for application areas where 'easy tear' is required.

Cast Film Production:

Films were produced on a Barmag CAST-Coex pilot line, equipped with an extruder of 60 mm diameter and an L/D ratio of 30. A coathanger die with a die width of 800 mm and a die gap of 0.5 mm was used.

The 50 µm films were produced in cast mode with an output of 60 kg/h, a line speed of 30 m/min and a melt temperature of 239° C.

Roll settings: 1$^{st}$ roll: diameter 400 mm and 15° C.; 2$^{nd}$ roll: diameter 250 mm and 25° C. Electric pinning via electrostatic charging was applied.

INVENTIVE EXAMPLES

TABLE 1

| Polymerisation Data | | IE1 | IE2 | IE3 | IE4 | IE5 | CE1 |
|---|---|---|---|---|---|---|---|
| Prepolymerisation | | | | | | | |
| Temperature | °C. | 30 | 30 | 30 | 30 | 30 | 30 |
| TEAL/Ti ratio | mol/mol | 173 | 173 | 173 | 173 | 173 | 173 |
| TEAL/Donor ratio | mol/mol | 8.0 | 8.0 | 8.0 | 8.0 | 8.0 | 8.0 |
| Loop reactor | | | | | | | |
| Temperature | °C. | 80 | 80 | 80 | 80 | 80 | 80 |
| Split | Wt.-% | 45 | 39 | 39 | 46 | 46 | 43 |
| H2/C3 | mol/kmol | 0.4 | 0.4 | 0.4 | 0.3 | 0.6 | 1.0 |
| XCS | Wt.-% | 2.1 | 2.3 | 2.4 | 1.9 | 1.8 | 2.6 |
| MFR | g/10 min | 2.4 | 2.3 | 2.4 | 2.0 | 2.5 | 3.6 |
| GPR 1 | | | | | | | |
| Temperature | °C. | 80 | 80 | 80 | 80 | 80 | 80 |
| Split | Wt.-% | 47 | 49 | 50 | 46 | 46 | 44 |
| H2/C3 | mol/kmol | 7 | 7 | 7 | 7 | 7 | 15 |
| XCS | Wt.-% | 2.0 | 1.9 | 1.7 | 1.7 | 1.5 | 2.8 |
| MFR | g/10 min | 2.5 | 2.4 | 2.4 | 2.5 | 2.8 | 12.0 |
| GPR 2 | | | | | | | |
| Temperature | °C. | 75 | 75 | 75 | 75 | 75 | 75 |
| Split | Wt.-% | 8 | 12 | 11 | 8 | 8 | 13 |
| C2/C3 | mol/kmol | 418 | 261 | 223 | 393 | 291 | 513 |
| H2/C2 | mol/kmol | 387 | 455 | 551 | 391 | 397 | 220 |
| C2 total | Wt.-% | 3.88 | 5.67 | 4.27 | 3.93 | 2.74 | 6.62 |
| XCS | Wt.-% | 11.0 | 17.0 | 15.0 | 11.0 | 8.9 | 17.0 |
| C2(XCS) | Wt.-% | 35.0 | 30.0 | 26.0 | 34.2 | 29.4 | 39.0 |
| IV(XCS) | dl/g | 1.95 | 1.77 | 1.64 | 1.87 | 1.87 | 1.87 |

TABLE 2

| Mechanical and analytical characterisation: | | IE1 | IE2 | IE3 | IE4 | IE5 | CE1 | CE2 | CE3 | CE4 |
|---|---|---|---|---|---|---|---|---|---|---|
| MFR | g/10 min | 2.8 | 3.0 | 3.0 | 2.8 | 2.9 | 5.0 | 3.0 | 3.1 | 3.0 |
| Further nucl agent (d) | | 1250 ppm HPN20E | 1250 ppm HPN20E | 1250 ppm HPN20E | 1250 ppm HPN20E | 1250 ppm HPN20E | 0 | 1000 ppm NA21 | 1000 ppm NA21 | 1000 ppm NA21 |
| Polymeric nucleating (c) | | 0.3 ppm PVCH | 0.3 ppm PVCH | 0.3 ppm PVCH | 15 ppm PVCH | 15 ppm PVCH | 0 | 0 | 0 | 0 |
| Tc | | 126 | 126 | 126 | 128 | 128 | 118 | 127 | 127 | 125 |
| Tm | | 166 | 166 | 166 | 167 | 167 | 164 | 166 | 166 | 165 |
| [mmmm] (XCU) | % | 97.0 | 97.2 | 97.2 | 97.0 | 96.9 | 96.5 | n.d. | n.d. | n.d. |
| IV(XCU) | dl/g | 2.97 | 2.99 | 2.97 | 3.06 | 2.95 | 2.77 | 2.95 | 2.93 | 2.86 |
| XCS | Wt.-% | 11.0 | 17.0 | 15.0 | 11.0 | 8.9 | 17.0 | 13.0 | 16.0 | 12.0 |
| C6$_{FDA}$ | Wt.-% | 1.7 | 1.7 | 1.7 | 1.6 | 1.4 | 2.2 | n.d. | n.d. | 2.0 |
| C2-total | Wt.-% | 3.88 | 5.67 | 4.27 | 3.93 | 2.74 | 6.62 | 5.72 | 7.22 | 3.90 |
| IV(XCS) | dl/g | 1.95 | 1.77 | 1.64 | 1.87 | 1.87 | 1.87 | 1.40 | 1.30 | 1.80 |
| C2(XCS) | Wt.-% | 35.0 | 30.0 | 26.0 | 34.2 | 29.4 | 39.0 | 44.5 | 45.0 | 29.0 |
| Tg1 | °C. | −49 | −39 | −39 | −49 | −47 | −50 | n.d. | n.d. | −45 |
| Tg2 | °C. | 0.7 | 0.7 | −0.3 | 0.1 | 0.5 | 5.8 | n.d. | n.d. | −1.9 |
| G' | MPa | 804 | 716 | 734 | 776 | 806 | 572 | n.d. | n.d. | 539 |
| Flex. Modulus | MPa | 1615 | 1232 | 1277 | 1574 | 1608 | 1118 | 1481 | 1268 | n.d. |
| NIS + 23° C. | kJ/m$^2$ | 20.1 | 48.7 | 36.9 | 27.2 | 11.5 | 8.4 | 16.0 | 38.0 | n.d. |

TABLE 3

Film properties

| Film properties | | IE1 | IE2 | IE3 | IE4 | IE5 | CE1 | CE2 | CE3 | CE4 |
|---|---|---|---|---|---|---|---|---|---|---|
| Cast 50 um Tensile modulus-MD | MPa | 1407 | 892 | — | 1427 | 1497 | 640 | 960 | 1084 | 1316 |
| Tensile modulus-TD | MPa | 1238 | 817 | — | 1274 | 1319 | 561 | 820 | 913 | 1139 |
| Dyna. Test + 23° C. | J/mm | 12 | 10 | — | 12 | 12 | 11 | | | 11 |
| Haze$_{(C50)}$ | % | 8 | 8 | — | 7 | 7 | 22 | 6 | 6 | 7 |
| Blown Film (50 um) Tensile modulus-MD | MPa | — | — | — | 1687 | — | — | — | — | 1572 |
| Tensile modulus-TD | MPa | — | — | — | 1477 | — | — | — | — | 1314 |
| DDI | g | — | — | — | 168 | — | — | — | — | 174 |
| Haze | % | — | — | — | 13.8 | — | — | — | — | 14.2 |
| Tear MD | N/mm | — | — | — | 3.81 | — | — | — | — | 4.22 |
| Tear TD | N/mm | — | — | — | 13.9 | — | — | — | — | 13.8 |
| Tear TD/MD | — | — | — | — | 3.65 | — | — | — | — | 3.28 |

As can be seen from table 2 both the inventive examples IE1 to IE5 and the comparative examples CE1 to CE4 show good impact and stiffness properties. However the amount of extractable substances, expressed as C6 FDA is clearly reduced for the heterophasic polypropylene compositions of the present invention IE1 to IE5.

Table 3 shows that films made from the heterophasic polypropylene compositions of the present invention while having the required low haze values additionally have very good tensile properties. The respective tensile moduli MD and TD both for cast and for blown films are higher than for all comparative examples (see IE1, IE4, IE5 compared to CE1 to CE4 for cast films and IE4 compared to CE4 for blown films). Additionally the inventive blown film example IE4 has a clear advantage in the TD/MD ratio when compared to CE4.

With those properties the heterophasic polypropylene compositions of the present invention are perfectly suitable for many kinds of applications, including food related applications.

The invention claimed is:

1. A heterophasic polypropylene composition having an MFR230/2.16 according to ISO1133 of at most 6.0 g/10 min and comprising:
    a. ≥80.0 wt. % of a polypropylene homopolymer and
    b. <20.0 wt. % of an elastomeric ethylene-propylene rubber fraction,
    c. a polymeric nucleating agent and
    d. at least one further nucleating or clarifying agent;
    wherein the heterophasic polypropylene composition further comprises a xylene soluble fraction (XCS) of 5.0 to 20.0 wt. % and the elastomeric ethylene-propylene rubber fraction (b) has an ethylene content C2(XCS) of 20.0 to 38.0 wt. %;
    wherein the polypropylene homopolymer (a) has a melt flow rate MFR230/2.16 according to ISO1133 in the range of 1.0 to 6.0 g/10 min and an intrinsic viscosity (IV) according to ISO1628/1 in the range of 2.5 to 3.4 dl/g; and
    wherein the elastomeric ethylene-propylene rubber fraction (b) has an intrinsic viscosity IV according to ISO1628/1 in the range of 1.4 to 2.1 dl/g.

2. The heterophasic polypropylene composition according to claim 1, wherein the heterophasic polypropylene composition comprises a hexane soluble value (C6$_{FDA}$) of ≤2.0 wt. %.

3. The heterophasic polypropylene composition according to claim 1, wherein the further nucleating or clarifying agent (d) is selected from the group comprising salts of monocarboxylic acids and polycarboxylic acids.

4. The heterophasic polypropylene composition according to claim 1, wherein the heterophasic polypropylene composition has:
    (I) a Flexural Modulus according to ISO 178 in the range of 1500 to 1750 MPa, and
    a Charpy notched impact strength NIS+23° C. according to ISO 179 in the range of 11.5 to 25.0 kJ/m², or
    (II) a Flexural Modulus according to ISO 178 in the range of 1200 to 1400 MPa, and
    a Charpy notched impact strength NIS+23 C according to ISO 179 in the range of 30.0 to 80.0 kJ/m².

5. The heterophasic polypropylene composition according to claim 1, comprising either:
    (I) 88.0 to 93.0 wt. % of the polypropylene homopolymer (a) and 7.0 to 12.0 wt. % of the ethylene propylene rubber (b), or
    (II) 82.0 to 85.5 wt. % of the polypropylene homopolymer (a) and 14.5 to 18.0 wt. % of the ethylene propylene rubber (b).

6. The heterophasic polypropylene composition according to claim 1, wherein the polypropylene composition is polymerised in the presence of a Ziegler-Natta catalyst, wherein the Ziegler-Natta catalyst comprises:
    a. compounds of a transition metal (TC) of Group 4 to 6 of IUPAC,
    b. a Group 2 metal compound (MC), and
    c. an internal donor (ID), wherein said internal donor is a non-phthalic compound,
    d. a co-catalyst, and
    e. optionally an external donor.

7. The heterophasic polypropylene composition according to claim 6, wherein the internal donor is selected from the group consisting of (di)esters of non-phthalic carboxylic (di)acids, 1,3-diethers, derivatives and mixtures thereof.

8. The heterophasic polypropylene composition according to claim 1, wherein the heterophasic polypropylene composition is free of phthalic acid esters as well as their respective decomposition products.

9. Extruded article comprising the heterophasic polypropylene composition according to claim 1.

10. Packaging article comprising the extruded article according to claim 9.

* * * * *